Feb. 9, 1937.  P. P. LEVENTIS ET AL  2,070,365
ELECTRIC BRAKE MECHANISM
Filed Feb. 21, 1936   3 Sheets-Sheet 2
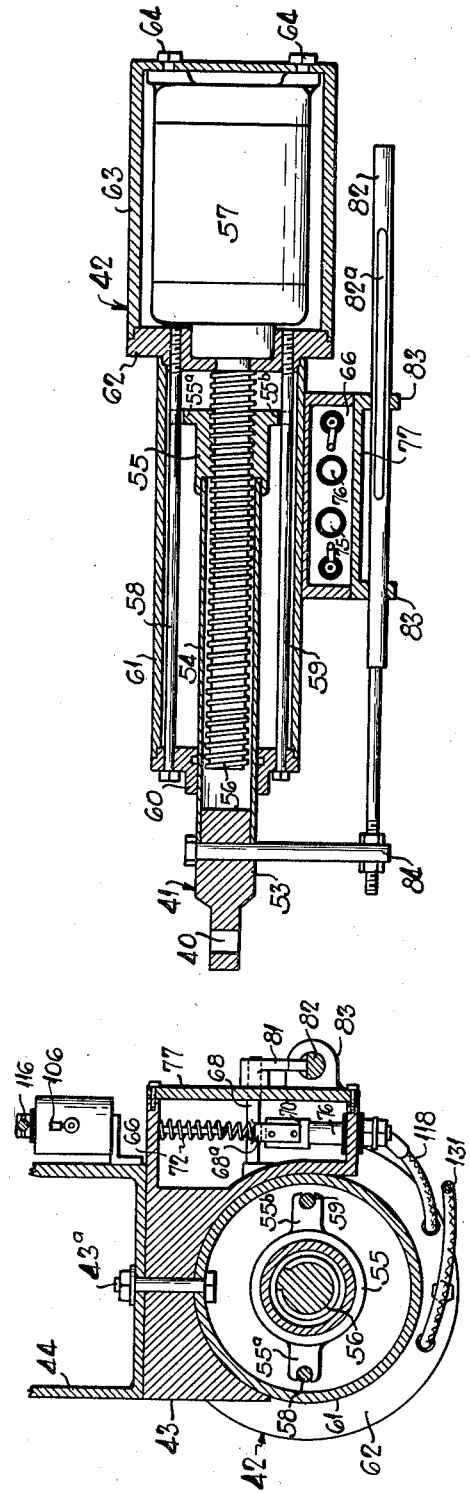
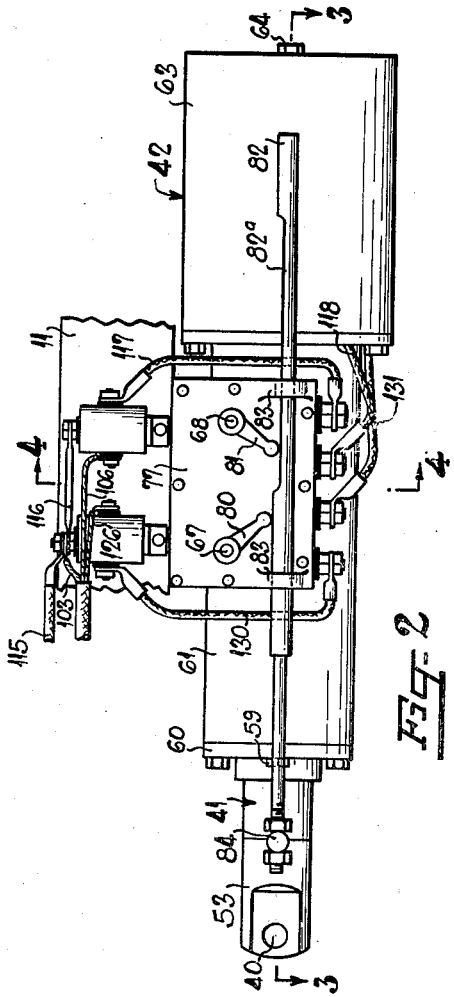
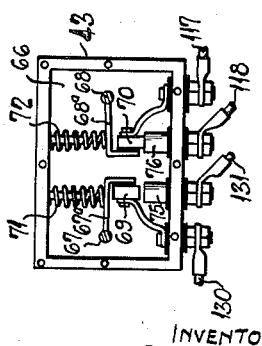
INVENTORS:
PETER P. LEVENTIS
AND
DANIEL R. LITTON
By  *Paul S Eaton*
Attorney

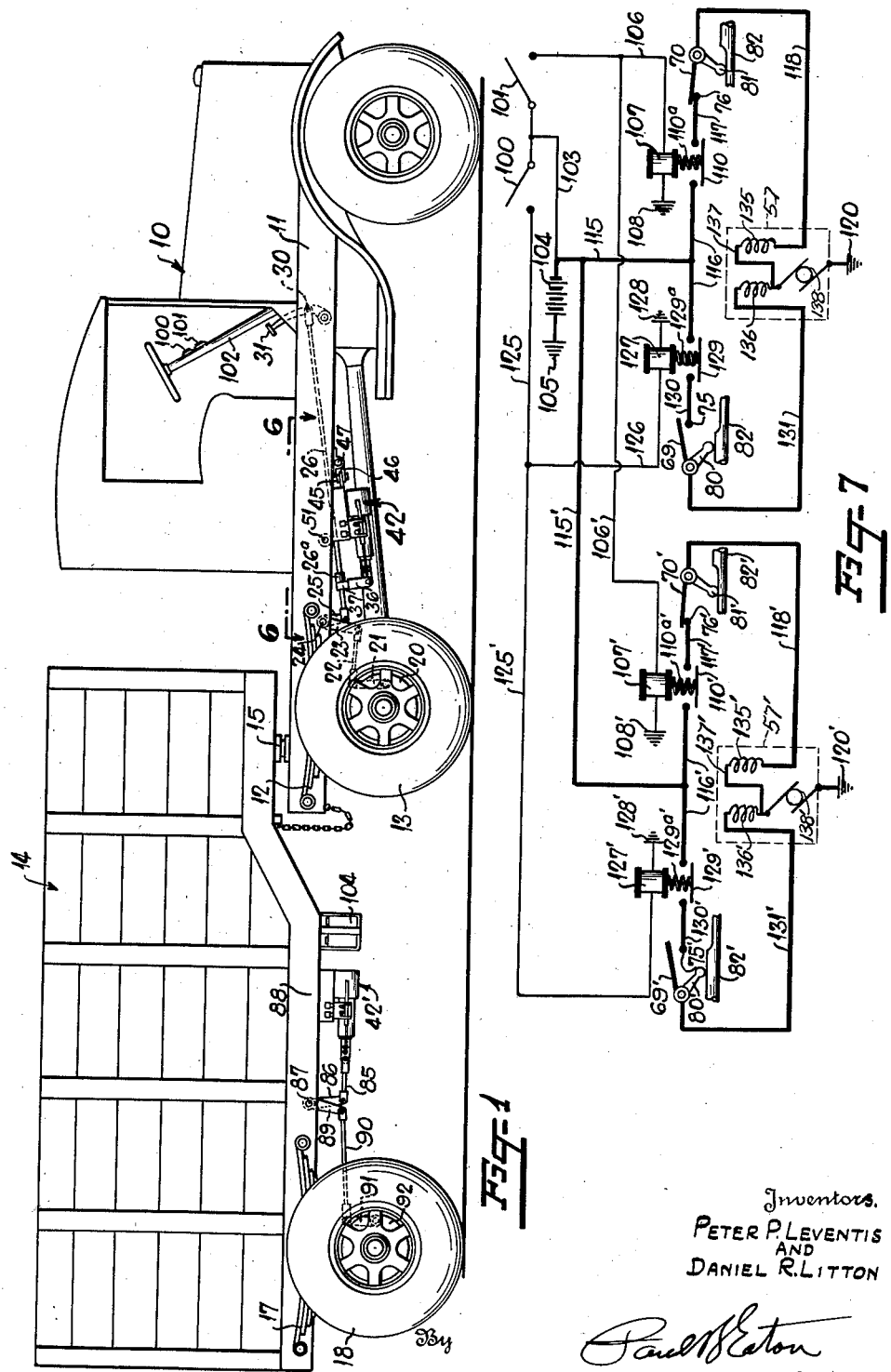

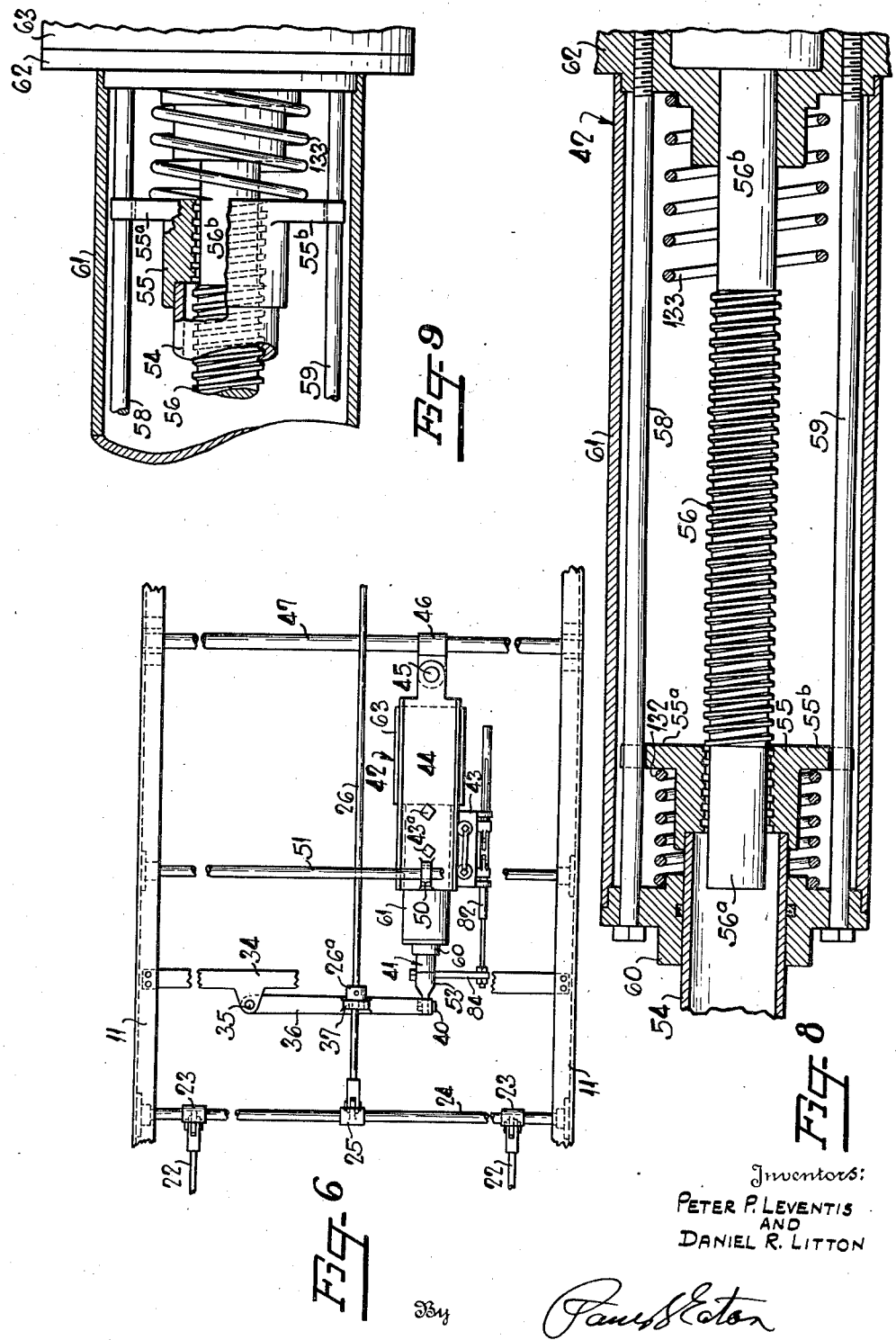

Patented Feb. 9, 1937

2,070,365

UNITED STATES PATENT OFFICE 2,070,365

ELECTRIC BRAKE MECHANISM

Peter P. Leventis and Daniel R. Litton, Gastonia, N. C., assignors to said Peter P. Leventis Application February 21, 1936, Serial No. 65,078

2 Claims. (Cl. 188—162)

This invention relates to a braking mechanism for motor vehicles and more especially to an electric brake adapted to be associated with the conventional brake of automobiles, trucks and the like.

It is an object of this invention to provide a mechanism for operating the brakes of a motor vehicle comprising a reversible electric motor having an extended threaded shaft upon which is threadably mounted a sleeve for operating the brake lever of the vehicle. Means are also provided whereby the motor may be driven in either direction to cause the brakes to be released or applied.

It is a further object of this invention to provide a mechanism for operating the brakes of motor vehicles comprising a reversible electric motor, an elongated threaded motor shaft for said motor, a sleeve having one end thereof threadably secured to said motor shaft and having its other end secured to the braking mechanism of the vehicle so that when the motor is rotated in one direction, the braking mechanism will be applied and when rotated in the opposite direction the braking mechanism will be released.

It is a further object of this invention to provide a mechanism for operating the brakes of an automotive vehicle comprising an electric motor for driving a sleeve longitudinally of the main drive shaft to operate the braking mechanism, a pair of switches manually operable for driving the motor in either of two directions, a second pair of switches operable by the brake applying and releasing means when said means has been advanced a predetermined amount.

If, for any reason, the said second pair of switches should not operate at the proper time, an additional safety means has been provided to prevent the parts from becoming jammed. This safety means is provided by having a smooth portion on the main drive shaft at each end of the threaded portion so that when the collar for driving the brake applying means has been screwed off the threaded portion no additional pressure will be applied to the brakes even though the motor continues to rotate.

It is another object of this invention to provide a brake operating means for any type of mechanism having a brake thereon, and although the drawings show the brake operating mechanism associated with an automotive vehicle, it is evident that the reversible electric motor and the means associated therewith can be used with any type of brake for any type of mechanism, such as elevators, trains, inter-urban cars, street cars, and in fact any type of apparatus having a brake which is applied and released as desired for stopping the mechanism and allowing the same to operate.

It is another object of the invention to provide an electric motor having a motor shaft extending from the motor, said extended shaft being threaded, and said threaded portion having means threadably mounted thereon, with work performing means connected to said threaded means so that the work performing means can be operated by rotation of said shaft. Means are also provided to limit movement of the threaded means on said shaft within certain limits to thus prevent damage to the apparatus.

Some of the objects of the invention having been stated, other objects will appear as the description proceeds when taken in connection with the accompanying drawings, in which:—

Figure 1 is a side elevation of a motor vehicle comprising a tractor and a trailer with the invention applied thereto;

Figure 2 is a side elevation of a portion of the invention for operating the brakes on a motor vehicle;

Figure 3 is a sectional plan view taken along the line 3—3 in Figure 2;

Figure 4 is a transverse sectional view taken along the line 4—4 in Figure 2;

Figure 5 is a sectional elevation of the central portion of Figure 2 with the cover thereof removed showing the circuit breakers;

Figure 6 is a plan view taken along the line 6—6 in Figure 1 showing portions of the chassis and the application of the invention to the brake mechanism;

Figure 7 is a schematic wiring diagram of the invention;

Figure 8 is a sectional plan view similar to the central portion of Figure 3 showing a modified form of the invention with the parts in an extended position;

Figure 9 is a sectional view similar to the right-hand portion of Figure 8 but showing the parts in a contracted or closed position.

Referring more specifically to the drawings, the numeral 10 denotes a tractor having chassis 11, springs 12 and rear wheels 13. A suitable trailer 14 is shown as being drawn by the tractor 10 and is secured thereto as at 15. This trailer has springs 17 and wheels 18 for supporting the same.

Each of the wheels 13 has a suitable brake drum 20 which contains conventional braking mechanism which are operated by brake lever 21, said brake lever having pivoted to the upper end thereof one end of a link 22. The other end of link 22 is pivoted to the lower end of a lever 23 which lever extends upwardly and is fixedly secured on a suitable cross shaft 24 rotatably mounted between the opposite sides of chassis 11. It should be noted that the parts 21 to 23 inclusive, are in duplicate, that is, one for operating each of the brakes for the rear wheels 13. The cross shaft 24 has fixedly secured thereon another lever 25 which has pivotally secured to the lower end thereof a link or connecting rod 26 which extends forwardly of the tractor 10 and is pivotally secured as at 30 to foot lever 31. The parts thus far described are conventional for trucks, but it is deemed necessary to make this disclosure to show how the present device is adapted to operate. However, it can be seen that when the foot lever 31 is pressed forwardly that the link 26 will likewise move forwardly to cause the cross shaft 24 to rotate in a counter manner to apply brakes to the wheel 13.

A cross member 34 has each end thereof secured to the chassis 11 and pivoted to this cross piece, as at 35, is a lever 36, said lever having an upwardly extending lug 37 integral therewith which is loosely penetrated by the rod 26. A collar 26a is also secured on the rod 26 which is adapted to be engaged by the lug 37 when the brakes are being applied by the braking mechanism which will be presently described.

The free end of lever 36 is pivoted as at 40 to the end of a sleeve 41. Sleeve 41 is slidably mounted in brake actuating unit broadly noted by the reference character 42. This unit is secured by any suitable means such as bolts 43a to a bracket 43, said bracket 43 being secured to channel 44 by the same bolts. This channel 44 is pivoted as at 45 to a cuff 46 which is rotatably mounted upon a cross rod 47 supported by the opposed channels of chassis 11. The channel 44 has a lug 50 integral therewith which extends upwardly and has a rod 51 loosely penetrating the same.

By having channel 44 mounted in this manner it is possible to obtain a universal movement of the brake mechanism in order to cooperate with the arcuate movement of the lever 36 thereby causing the same to automatically adjust itself so as to be in alinement with the line of force.

The sleeve 41 is constructed by placing a fitting 53 securely on one end of a pipe 54 and having a collar 55 secured on the other end of said pipe, said collar 55 being threadably mounted on threaded portion of extended shaft 56 of motor 57. The motor 57 causes the motor shaft 56 to rotate thereby moving the collar 55 back and forth upon the threaded portion of the shaft 56 depending upon the direction of rotation of shaft 56. The collar 55 has lugs 55a and 55b extending laterally therefrom, the end of said lugs having cavities adapted to slidably engage rods 58 and 59. These rods penetrate the cap 60 which, in turn, fits over the housing 61. This housing has the right-hand end thereof, Figure 3, secured to cap 62, said cap 62 being also secured to motor housing 63. The bolts or rods 58 and 59 have the ends thereof threadably secured in the cap 62 and normally hold the cap 60, the housing 61 and cap 62 together. The motor 57 is secured within the housing 63 by any suitable means such as stud bolts 64. The bracket 43 partially encircles a portion of the housing 61, and this bracket has a cavity 66 in which is rotatably mounted shafts 67 and 68 having secured thereto arms 67a and 68a with contacts 69 and 70, respectively, mounted on the free end thereof.

Compression springs 71 and 72 have their upper ends normally engaging the upper portion of the opening 66 and their lower end normally engaging the contact arms for pressing the contacts 69 and 70 toward a closed position. The contacts 69 and 70 are adapted to contact terminals 75 and 76 which lead to the motor 57 for supplying current to the same. A more detailed description of the wiring diagram will be made in connection with the operation of the device.

The opening 66 has a cover 77 secured thereover, which cover is penetrated by the shafts 67 and 68. On the portions of shafts 67 and 68, extending outside of the cover, are secured a pair of levers 80 and 81 which have their free ends projecting downwardly and normally contacting the longitudinally disposed rod 82. This rod has an elongated notch 82a in the upper surface thereof which, when engaged by one of the levers 80 or 81, will allow the contacts 69 or 70 to engage the terminals 75 or 76. When the lower ends of levers 69 and 70 are not resting in the elongated notch 82a, the contact will be broken in a manner similar to the position shown in the left-hand portion of Figure 5. It will be noted by referring to Figures 2 and 5, that the lever 80 is not resting in the notch 82a, therefore, the contact 69 is not resting upon the terminal 75. In this position, the unit 42 is in a contracted position and the brakes will be applied to the tractor and trailer brake drums when in this position. If the brakes are desired to be released, the direction of rotation of motor 57 is reversed and the shaft 56 is rotated to cause the sleeve 41 to be in an extended position. When it has extended to the desired position the lower end of the lever 81 will ride out of notch 82a onto the upper side of rod 82 to cause the contact 70 to be lifted off of the terminal 76 to break the circuit to the motor. The rod 82 is mounted for longitudinal movement in lugs 83 which lugs are integral with the cover 77 for the opening 66. The left-hand end of rod 82 is secured to a pin 84, which pin penetrates the end of member 41. It is seen that by making this construction that the rod 82 will move longitudinally of the device along with the member 41 thereby causing the contacts 69 and 70 to be broken when the member 41 has extended or contracted to the desired position.

The device for operating the brakes on the trailer portion, as shown in Figure 1, is identical in all respects to the device for operating the brakes on the tractor. However, a different form of application must be devised, and in this particular instance, the end of the sleeve 41 has pivotally connected thereto a link 85, said link having its other end pivotally secured to the lower end of a lever 86. The lever 86 extends upwardly and is fixedly secured on a shaft 87, said shaft 87 being rotatably mounted in opposite sides of trailer chassis 88. The rod 87 also has fixedly secured thereon a pair of downwardly extending levers 89, only one lever being shown in the present instance, but it is evident that one lever must be provided for each wheel. The lower end of each of the levers 89 has pivotally secured thereto a horizontally disposed link 90 which has its other end pivotally secured to the upper end of brake lever 91 for operating the brake mechanism within the brake drum 92 of wheels 18 of the chassis. The operation of the trailer brakes is similar to that of the tractor, that is, when the member 41 is in an extended position the brakes on the trailer are released but when they are in a contracted position, the brakes are applied, although it is evident that the reverse effect could be produced by slightly changing the installation.

Figure 5 is a schematic wiring diagram of the device when applied to a tractor and a trailer. Suitable switches 100 and 101 are placed at any convenient point in the automobile or truck where they are accessible to the driver such as on steering column 102. These switches are the standard button type which are normally in an open position. When it is desired to apply or to release the brakes the proper switch is pressed to cause the motor to revolve in the desired direction. Current is supplied to the switches 100 and 101 through a wire 103, which wire is connected to one side of a battery 104. This battery 104 is grounded as at 105. The switch 101, when closed, furnishes current to wire 106 and this wire has the other end thereof connected to one side of a magnet 107 which magnet is grounded as at 108. When the switch 101 is closed the current is allowed to flow from battery 104 through wire 103, switch 101, wire 106 and to magnet 107 to cause the same to be energized, which, in turn, will close switch 110. When the switch 110 is closed the current will then flow from battery 104 through wire 115, wire 116, switch 110, wire 117, terminal 76, contact 70, wire 118 and to the motor 57. The motor 57 is of a reversible type and has two field windings therein, namely 135 and 136. These windings are connected to each other by means of wire 137, said wire 137 also being connected to one side of armature 138 which is grounded as at 120; therefore, the current from wire 118 will flow through field winding 135, wire 137, armature 138 and to ground 120, thereby causing the motor to run in one direction. In this type of motor only one of the field windings is used at a time but they are connected up so that the current will flow in an opposite direction in one winding from the direction that it flows in the other. This is provided because it is necessary to either reverse the leads to the field winding or the armature in order to reverse the direction of rotation of the motor. It should be noted that the switch 101 is of the press button type and immediately when it is released by the driver that the circuit becomes broken at that point; however, after it has been pressed and the switch 110 is closed, this switch will be automatically broken when the switch 101 is released since a compression spring 110a normally forces the switch to an opened position, when magnet 107 is de-energized. If, for any reason the switch 110 should be held open longer than necessary, or if the switch should become stuck, then the lever 81 which rests in notch 82a on longitudinal rod 82, will automatically break the circuit at terminal 76 when the sleeve portion 41 has been extended to a position where the lower end of lever 81 will ride out of the notch 82a. When it is desired to apply the brakes to an automobile or truck the switch 100 is closed thereby allowing the current to flow through wires 125 and 126 to the magnet 127, said magnet being grounded as at 128. When this magnet is energized a switch 129 is closed thereby allowing the current to flow directly from the battery 104, to wire 115, wire 116, switch 129, wire 130, contact 69, and wire 131, field winding 136, armature 138 and to ground 120. This will cause the motor to run in the opposite direction since the direction of flow of the current in the field winding has been reversed. When the member 41 has contracted a predetermined amount, the lower end of the lever 80 will ride out from within the notch 82a and cause the contact 69 to be raised out of contact with the terminal 75 to cause the current to be cut off. Since the switch 129 is normally held in opened position by a suitable compression spring 129a, it is evident that if the switch 100 is opened that the magnet 127 will be simultaneously de-energized to allow the spring 129a to open the switch 129 and thereby stop the motor.

The wiring for the trailer is identical to the wiring for the tractor, and therefore like reference characters will be given to like parts with a prime notation added. Although a detailed description of the wiring for the trailer will not be made since it is identical to that of the tractor, it should be noted that simultaneously with the closing of a switch to cause the brakes to be applied on the tractor, the current will also be furnished to cause the brakes to be applied to the trailer.

Conversely, when a switch is closed to cause the brakes to be released on the tractor, the brakes will be simultaneously released on the trailer. It is, therefore, seen that by providing a reversible motor that a very simple and inexpensive device can be provided for quickly and effectively applying the brakes on tractors and trailers without interfering in any way with the conventional foot brakes.

Figures 8 and 9 show a slightly modified form of the invention which is similar in all respects to the central portion of Figure 3, with the exception that the main drive shaft 56 has portions 56a and 56b which have no threads thereon. In addition to this feature, compression spring 132 is provided at one end of the cylinder or housing 61 and a compression spring 133 is provided at the other end. If, for any reason contacts 69 or 70 should not operate to break the circuit, and the motor should continue to run, the collar 55 would be caused to move by the threaded shaft until it reached the unthreaded portion 56a or 56b. The collar would remain in the position shown in Figures 8 or 9 until the rotation of the shaft had been reversed at which time the collar would immediately engage the threaded portion since the compression springs 132 and 133 will cause the threaded portions of the collar 55 to engage the threaded portion on the shaft 56 when the motor is rotated in the opposite direction. This feature makes it impossible for the collar 55 to jam either of the caps 60 or 62 and damage the device.

In the drawings and specification there has been set forth a preferred embodiment of the invention, and although specific terms are employed, they are used in a generic and descriptive sense only, and not for purposes of limitation, the scope of the invention being set forth in the appended claims.

We claim:
1. In a vehicle having wheels and brakes for said wheels, apparatus for applying or releasing said brakes, comprising a reversible electric motor having an armature shaft extending from one end thereof, said shaft having an intermediate portion of said extending portion threaded and having its outer end and a portion next to the motor unthreaded, an internally threaded member threadably mounted on said threaded portion of said shaft, a coiled spring disposed around each unthreaded portion of said shaft, a connection between said internally threaded member and said brakes whereby rotation of said shaft will move said brakes, a pair of electri- cal circuits connected to said motor whereby electrical energy can be applied to one circuit at a time to rotate said shaft in the desired direction, a switch in each of said circuits, a lever for operating each switch, a rod carried by said internally threaded member and having a raised portion on each end thereof for engaging one of said levers to break one of the circuits to the motor when the internally threaded member has moved a predetermined amount on said shaft, and said coiled springs serving to cause engagement between the threaded portion of said shaft and said internally threaded member when said shaft is rotated in a direction opposite to that which placed the internally threaded member on an unthreaded portion of said shaft.

2. In apparatus having brakes, means for operating the brakes to apply the same and to release the same comprising a reversible electric motor having an armature and a shaft on which the armature is wound and also having a pair of circuits leading through said motor, said armature shaft extending from one end of the motor, the extending portion of said shaft being threaded, along the central portion thereof and having an unthreaded portion contiguous each end of the threaded portion, a sleeve threadably mounted on said threaded portion, a compression spring encircling each unthreaded portion of said shaft, a switch in each circuit, apparatus carried by the sleeve for opening one of said switches at a time when the sleeve moves to a predetermined point on said threaded portion, and said spring serving to hold said sleeve in a position where it will engage the threaded portion when the direction of rotation of the shaft is reversed, a connection between said means and said brakes, means for supplying electrical energy to said circuits, and means for controlling the application of energy to said circuits to thereby cause rotation of the motor in the desired direction and to thus apply or release the brakes depending upon the direction of rotation of said motor.

PETER P. LEVENTIS.
DANIEL R. LITTON.